United States Patent [19]

Kitaj et al.

[11] Patent Number: 5,995,628
[45] Date of Patent: Nov. 30, 1999

[54] FAILSAFE SECURITY SYSTEM AND METHOD

[75] Inventors: Paul Thomas Kitaj, Gilbert; Douglas Allan Hardy; Francis Gregory Sydnor, both of Scottsdale, all of Ariz.

[73] Assignee: Motorola, Inc., Schaumburg, Ill.

[21] Appl. No.: 08/835,000

[22] Filed: Apr. 7, 1997

[51] Int. Cl.[6] .............................. H04K 1/00; H04L 9/00
[52] U.S. Cl. ..................................... 380/49; 380/2; 380/4
[58] Field of Search .............................. 380/2, 3, 4, 49, 380/59; 713/200, 201

[56] References Cited

U.S. PATENT DOCUMENTS

| | | | |
|---|---|---|---|
| 4,368,357 | 1/1983 | Gurak ........................................... | 380/2 |
| 4,987,595 | 1/1991 | Marino, Jr. et al. ........................ | 380/50 |
| 5,029,206 | 7/1991 | Marino, Jr. et al. ........................ | 380/4 |
| 5,365,591 | 11/1994 | Carswell et al. ........................... | 380/49 |

Primary Examiner—Pinchus M. Laufer
Attorney, Agent, or Firm—Frank J. Bogacz

[57] ABSTRACT

Controllable functions (210, 220, 230) and controllable connection managers (212, 222, 216, 226) are used to provide a fail-safe security system implemented on a single processor (200). Red subsystems, black subsystems and clear bypass subsystems ensure separation between red data and black data. Connection managers (212, 222, 216, 226) are used to isolate and control red data ports (214), black data ports (224), red crypto ports (218), and black crypto ports (228). Subsystems are configured to control data flow, provide data separation, access control and prevent single failures from compromising security system (200). Each subsystem is managed separately, and each subsystem has unique access protection provided by controller (202). Within security system (200), the subsystems are kept separate. Functional separation of the red data memory and black data memory is maintained to provide fail-safe data isolation.

24 Claims, 6 Drawing Sheets

-PRIOR ART-

FAILSAFE SECURITY SYSTEM AND METHOD

FIELD OF THE INVENTION

The present invention pertains to cryptographic devices and, more particularly, to an apparatus and method for providing a fail-safe security system.

BACKGROUND OF THE INVENTION

A traditional security system consists of a red processor which handles unencrypted data and a black processor which handles encrypted data. This type of system with separate processors permits a high level of assurance that red data cannot be mixed with black data. This type of system also ensures that only the red processor can access the red resources and the black processor can only access the black resources. In order to simplify the system design and lower the cost of the system, it is desirable to implement a security system which consists of a single processor and the use of an off-the-shelf operating system such as Windows NT™.

When red and black processes and resources are combined into a single processor, several problems arise that must be resolved. One problem is data separation between red data and black data. A second problem involves access control both for red and black resources and for any particular resource at a particular time. The third problem involves denial of service.

In order to provide data separation a security system must ensure that the red data cannot be mixed with the black data. In addition, the security system must have the ability to have multiple secure and non-secure channels. This causes the additional problem of ensuring that red data on one channel is kept separate from red data on another channel.

The access control problem requires a security system to ensure that only the proper functions are permitted to access specific resources. Only red data functions are permitted to access red resources and only black data functions are permitted access to the black resources. In addition, the security system must guarantee that only one function can access a resource at any given time. This is further complicated when different functions are permitted to access a given resource depending on the state of the system.

To solve the denial of service problem, a security system must have a mechanism to remove the ability to access a resource after the access has been granted. In some systems, it is possible for some functions to access resources only during specific states of the system. For example, in some systems a bypass function can access the resources while the system is in the clear mode. In any other state of operation, the system must limit the ability of the function to access the resource. This is necessary so that the ability to access resources can be removed in the event of a security problem being detected.

What are needed are a method and apparatus which solve these problems in a single processor fail-safe environment.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The method and apparatus of the present invention provide a method and apparatus for ensuring data separation, providing access control, providing a denial of service capability, and preventing single failures from compromising the system. The present invention separates the data management task into several independent subsystems. Each subsystem is managed separately and has unique access protection. Within the controller, the subsystem control operations are kept separate and functional separation of the secure and clear memory is maintained to provide fail-safe data isolation.

In a preferred embodiment of the present invention, a security system with resource management has been developed for use with a Windows NT™ operating system. The security system ensures separation between red data, black data, and command data within the address space of a Windows NT™ multi-tasking operating system. Some operating systems, for example Windows NT™, do have some data separation mechanisms, however these mechanisms do not sufficiently isolate the data, especially while the data is entering or leaving the operating system. These mechanisms do not provide any means for controlling access to a given resource based on the state of the system. In addition, these mechanisms do not provide any means for removing the ability to access a resource once permission to access the resource has been granted. These mechanisms are not designed to be fail-safe. This means that if a processing error occurs, there is no assurance that the security system is not compromising sensitive data.

Figure 1:
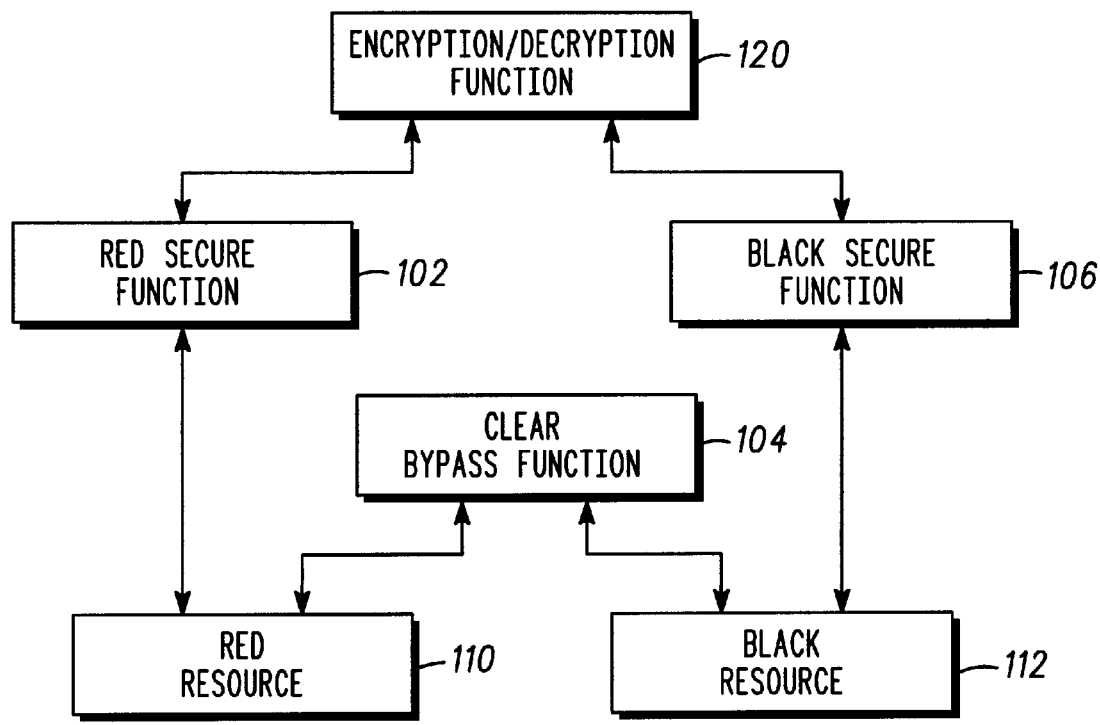
FIG. 1 shows a simplified block diagram of a prior art security system.

FIG. 1 shows a simplified block diagram of a prior art security system. The prior art security system 100 operates using multiple processors and comprises red secure function 102, clear bypass function 104, black secure function 106, red resource 110, encryption/decryption function 120, and black resource 112.

Red secure function 102 is performed on one processor and black secure function 106 is performed on a second processor. Clear bypass function 104 is performed by a third processor and it can read and write from both red resource 110 and black resource 112. While prior art security system 100 is in one state, clear bypass function 104 can access the red resource 110 and black resource 112. While prior art security system 100 is in another state, red secure function 102 can access red resource 110 and black secure function 106 can access black resource 112 and if an error occurs clear bypass function 104 can also access red resource 110 and/or black resource 112. A security failure occurs when a function accesses a resource at a wrong time or a wrong function tries to access a resource.

A key problem in the prior art security system 100 is resource allocation. In prior art security system 100, privilege to access a resource cannot be removed after initial access has been granted. For example, clear bypass function is allowed to access red resource 110 while in one state.

When a security problem occurs, prior art security system 100 does not have a means to remove the ability for the functions to access red resource 110 and black resource 112.

Figure 2:
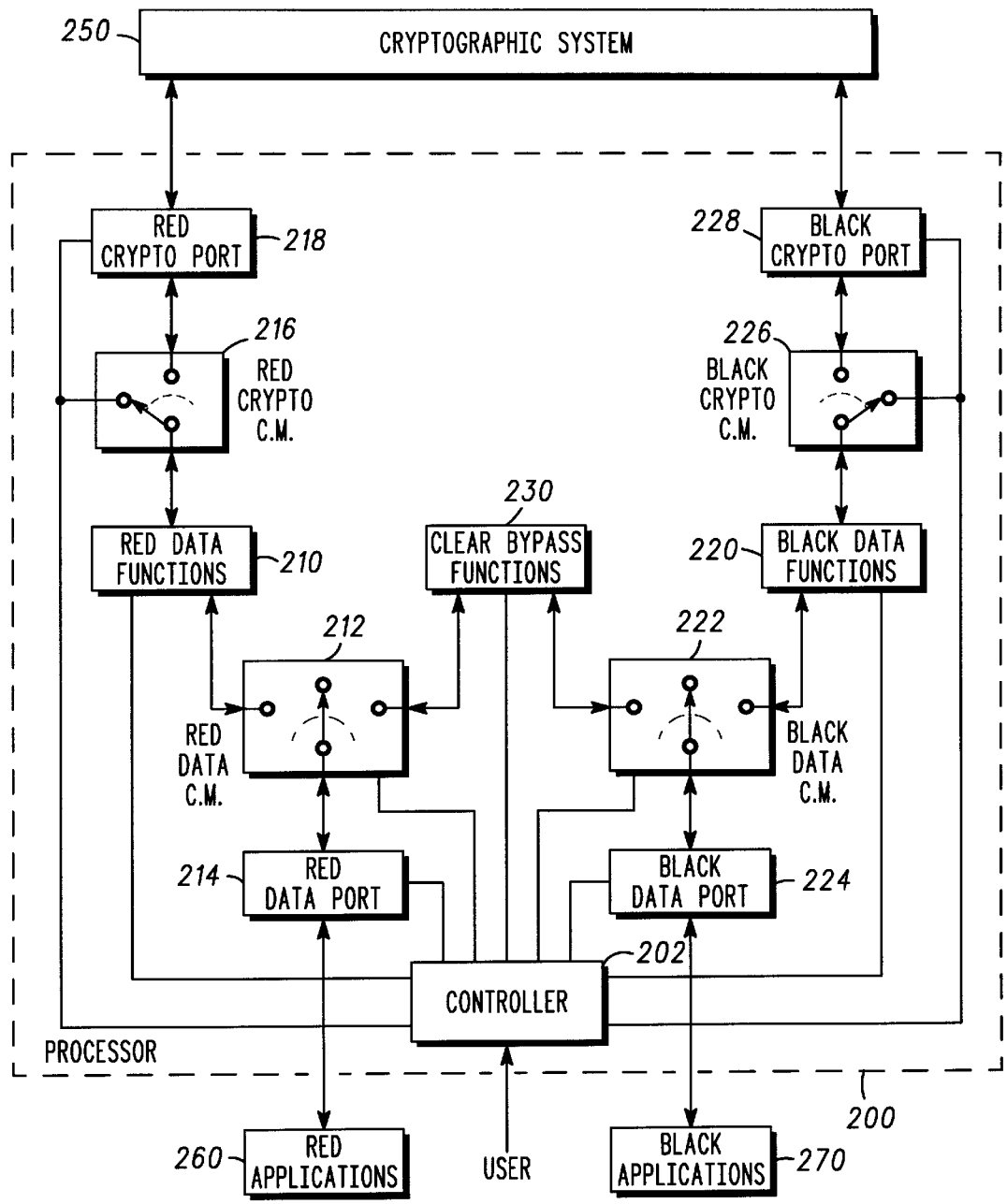
FIG. 2 shows a simplified block diagram of a security system in accordance with a preferred embodiment of the present invention.

FIG. 2 shows a simplified block diagram of a security system in accordance with a preferred embodiment of the present invention. Security system 200 comprises controller 202, red data function 210, red crypto port 218 red crypto connection manager 216, red data port 214, red data connection manager 212, black data function 220, black crypto port 228, black crypto connection manager 226, black data port 224, black data connection manager 222, and clear bypass function 230. Security system 200 interfaces with cryptographic system 250, red application 260, and black application 270. Controller 202 is linked to red data function 210, to red crypto port 218, to red crypto connection manager 216, to red data port 214, to red data connection manager 212, to black data function 220, to black crypto port 228, to black crypto connection manager 226, to black data port 224, to black data connection manager 222, and to clear bypass function 230.

Connection managers are used to ensure that only the designated functions can access particular ports. Connection managers also ensure that only one function is connected to one port at a particular time. In addition, connection managers provide a mechanism to remove the ability of a function from accessing a port once that function has been granted access.

Connection managers can operate in two different states. The first state is an idle state. In the idle state, connection managers are linked to a specific port, but the connection managers are preventing any data from flowing through that port. In the idle state, the connection managers have processes running which are looking for access requests from functions. In this state, the connection manager is a server waiting for a client. In the idle state, data transfer through the connection manager is not allowed.

The second state in which a connection manager can operate is the allocated state. In the allocated state, the connection manager is allocated to a particular function. The connection manager contains a list of valid functions which are allowed access to the connection manager. In a preferred embodiment of the present invention, this means a connection manager can be operating in a first allocated state in which the connection manager is allocated to the first function on its list. This also means that the connection manager is allocated to the second function on its list when the connection manager is operating in a second allocated state. In other embodiments, the connection managers list could contain any number of valid functions which are allowed access.

In the allocated state, data transfer is allowed through the connection manager. This means that the function and the port associated with a particular connection manager can exchange data. The data exchange occurs through the connection manager. In the allocated state, a connection manager can transfer data from the port to the function when the connection manager is operating in a read state, and a connection manager can transfer data from the function to the port when the connection manager is operating in a write state. Connection managers can be implemented as single direction devices or dual direction devices.

Red data connection manager 212 only permits one red data function 210 or one clear bypass function 230 to access red data connection manager 212 at a particular time. Since red data connection manager 212 is only connected to one red data port 214, red data connection manager 212 only permits one red data function 210 or one clear bypass function 230 to access red data port 214 at a particular time.

The access list for red data connection manager 212 can contain multiple red data functions 210 and multiple clear bypass functions 230. Black data functions 220 are not allowed access to red data connection manager 212. For example, if black data function 220 attempts to access red data connection manager 212, then red data connection manager 212 blocks the access attempt. In addition, if for any reason controller 202 determines that a current access allocation should be terminated, then controller 202 sends a message to red data connection manager 212, and red data connection manager 212 stops the current function from accessing red data connection manager 212.

Red data connection manager 212 also ensures that only one function can access red data connection manager 212 at a particular time. For example, if a second red data function tries to gain access to red data connection manager 212 when red data connection manager 212 is allocated to a first function, then red data connection manager 212 blocks the access attempt by the second red data function. Red data connection manager has a pending queue which is used to keep track of the last function which made an access attempt, but which has not been serviced yet.

Red crypto connection manager 216 only permits one red data function 210 to access red crypto connection manager 216 at a particular time. Since red crypto connection manager 216 is only connected to one red crypto port 218, red crypto connection manager 216 only permits one red data function 210 to access red crypto port 218 at a particular time.

The access list for red crypto connection manager 216 can contain multiple red data functions 210. Black data functions 220 and clear bypass functions 230 are not allowed access to red crypto connection manager 216. For example, if black data function 220 attempts to access red crypto connection manager 216, then red crypto connection manager 216 blocks the access attempt. In addition, if for any reason controller 202 determines that a current access allocation should be terminated, then controller 202 sends a message to red crypto connection manager 216, and red crypto connection manager 216 stops the current function from accessing connection manager 216.

Red crypto connection manager 216 also ensures that only one red data function can access red crypto connection manager 216 at a particular time. For example, if a second red data function tries to gain access to red crypto connection manager 216 when red crypto connection manager 216 is allocated to a first function, then red crypto connection manager 216 blocks the access attempt by the second red data function. Red crypto connection manager has a pending queue which is used to keep track of the last function which made an access attempt, but which has not been serviced yet.

Black data connection manager 222 only permits one black data function 220 or one clear bypass function 230 to access black data connection manager 222 at a particular time. Since black data connection manager 222 is only connected to one black data port 224, black data connection manager 222 only permits one black data function 220 or one clear bypass function 230 to access black data port 224 at a particular time.

The access list for black data connection manager 222 can contain multiple black data functions 220 and multiple clear bypass functions 230. Red data functions 210 are not allowed access to black data connection manager 222. For example, if red data function 210 attempts to access black data connection manager 222, then black data connection manager 222 blocks the access attempt. In addition, if for any reason controller 202 determines that a current access allocation should be terminated, then controller 202 sends a message to black data connection manager 222, and black data connection manager 222 stops the current function from accessing black data connection manager 222.

Black data connection manager 222 also ensures that only one function can access black data connection manager 222 at a particular time. For example, if a second black data function tries to gain access to black data connection manager 222 when black data connection manager 222 is allocated to a first function, then black data connection manager 222 blocks the access attempt by the second black data function. Black data connection manager has a pending queue which is used to keep track of the last function which made an access attempt, but which has not been serviced yet.

Black crypto connection manager 226 only permits one black data function 220 to access black crypto connection manager 226 at a particular time. Since black crypto connection manager 226 is only connected to one black crypto port 228, black crypto connection manager 226 only permits one black data function 220 access to black crypto port 228 at a particular time.

The access list for black crypto connection manager 226 can contain multiple black data functions 220. Red data functions 210 and clear bypass functions 230 are not allowed access to black crypto connection managers 226. For example, if red data function 210 attempts to access black crypto connection manager 226, then black crypto connection manager 226 blocks the access attempt. In addition, if for any reason controller 202 determines that a current access allocation should be terminated, then controller 202 sends a message to black crypto connection manager 226, and black crypto connection manager 226 stops the current function from accessing black crypto port 228.

Black crypto connection manager 226 also ensures that only one black data function can access black crypto connection manager 226 at a particular time. For example, if a second black data function tries to gain access to black crypto connection manager 226 when black crypto connection manager 226 is allocated to a first function, then black crypto connection manager 226 blocks the access attempt by the second black data function. Black crypto connection manager has a pending queue which is used to keep track of the last function which made an access attempt, but which has not been serviced yet.

A fail-safe security system for operation on a single processor (200) can comprise several red subsystems for processing red data, several black subsystems for processing black data, several clear bypass subsystems for processing bypassed data, and a controller linked to the red subsystems, to the black subsystems, and to the clear bypass subsystems. Bypassed data can be black data at some times and red data at other times. The controller inhibits processing by all of the red subsystems, by all of the black subsystems, and by all of the clear bypass subsystems when an error is detected. Red subsystems and black subsystems are established when the system or a portion of the system is operating in the secure traffic state. Clear bypass subsystems are established when the system or a portion of the system is operating in the clear traffic state.

In a preferred embodiment of the present invention, a red subsystem comprises: a red data port 214 for transferring red data into and out of the red subsystem from a user's red application 260, a red data function 210 for processing the red data, a red data connection manager 212 linked to the red data port 214 and linked to the red data function 210. Red data connection manager 212 controls a connection between a red data port 214 and a red data function 210. The red subsystem also comprises a red crypto port 218 for transferring the red data into and out of the red subsystem from cryptographic system 250 and a red crypto connection manager 216 linked to red crypto port 218 and linked to red data function 210. Red crypto connection manager 216 controls a connection between a red crypto port 218 and a red data function 210.

In a preferred embodiment of the present invention, a black subsystem comprises: a black data port 224 for transferring black data into and out of the black subsystem from a user's black application 270, a black data function 220 for processing the black data, a black data connection manager 222 linked to the black data port 224 and linked to the black data function 220. Black data connection manager 222 controls a connection between a black data port 224 and a black data function 220. The black subsystem also comprises a black crypto port 228 for transferring the black data into and out of the black subsystem from cryptographic system 250 and a black crypto connection manager 226 linked to black crypto port 228 and linked to black data function 220. Black crypto connection manager 226 controls a connection between a black crypto port 228 and a black data function 220.

In a preferred embodiment of the present invention, a clear bypass subsystem comprises: a black data port 224 for transferring the bypassed data into and out of the clear bypass subsystem, a red data port 214 for transferring the bypassed data into and out of the clear bypass subsystem, and a clear bypass function 230 for processing the bypassed data. In addition, a clear bypass subsystem comprises a black data connection manager 222 which is linked to black data port 224 and which is linked to clear bypass function 230. Black data connection manager 222 controls a connection between black data port 224 and clear bypass function 230. Also, a clear bypass subsystem comprises a red data connection manager 212 which is linked to red data port 214 and which is linked to clear bypass function 230. Red data connection manager 212 controls a connection between red data port 214 and clear bypass function 230.

Red data connection manager 212 comprises: a first connection port which is for linking to red data port 214, and a second connection port which is for linking to a red data function 210 or for linking to a clear bypass function 230. Red data connection manager 212 also comprises an allocation control object. The allocation control object allocates the second connection port to red data function 210 when controller 202 determines that red data connection manager 212 is being used in a secure traffic state. The allocation control object allocates the second connection port to clear bypass function 230 when controller 202 determines that red data connection manager 212 is being used in a clear traffic state. The allocation control object does not allocate the second connection port to either red data function 210 or to clear bypass function 230 when controller 202 determines that red data connection manager 212 is being used in an idle state. Red data connection manager 212 also comprises an access control object for providing access control for the first connection port. In addition, red data connection manager 212 also comprises a path control object for connecting the first connection port to the second connection port when red data connection manager 212 is in an allocated state, and for disconnecting the first connection port from the second connection port when red data connection manager 212 is in an idle state.

The allocation control object in red data connection manager 212 also comprises a list which includes red data functions 210 and clear bypass functions 230 that are allowed access to the second connection port. The allocation control object also includes an authentication means for validating the identity of the functions using identification tags.

The access control object includes a linking means for connecting the first connection port to one of the red data ports. The linking means also reports the connecting status to controller 202.

The path control object in the red data connection manager further comprises a pointer transfer means for transferring a first memory location pointer between the first connection port and the second connection port when red data connection manager 212 is in an allocated state, and for not transferring the first memory location pointer when red data connection manager 212 is in an idle state.

Red crypto connection manager 216 comprises: a first connection port which is for linking to red crypto port 218, and a second connection port which is for linking to a red data function 210. Red crypto connection manager 216 also comprises an allocation control object. The allocation control object allocates the second connection port to red data function 210 when controller 202 determines that red crypto connection manager 216 is being used in a secure traffic state. The allocation control object does not allocate the second connection port to a red data function 210 when controller 202 determines that red crypto connection manager 216 is being used in an idle state. Red crypto connection manager 216 also comprises an access control object for providing access control for the first connection port. In addition, red crypto connection manager 216 also comprises a path control object for connecting the first connection port to the second connection port when red crypto connection manager 216 is in an allocated state, and for disconnecting the first connection port from the second connection port when red crypto connection manager 216 is in an idle state.

The allocation control object in red crypto connection manager 216 also comprises a list which includes the red data functions that are allowed access to the second connection port. The allocation control object also includes an authentication means for validating the identity of the functions using identification tags.

The access control object includes a linking means for connecting the first connection port to one of the red crypto ports. The linking means also reports the connecting status to controller 202.

The path control object in red crypto connection manager 216 further comprises a pointer transfer means for transferring a first memory location pointer between the first connection port and the second connection port when red crypto connection manager 216 is in an allocated state, and for not transferring the first memory location pointer when red crypto connection manager 216 is in an idle state.

Black data connection manager 222 comprises: a first connection port which is for linking to black data port 224, and a second connection port which is for linking to a black data function 220 or for linking to a clear bypass function 230. Black data connection manager 222 also comprises an allocation control object. The allocation control object allocates the second connection port to black data function 220 when controller 202 determines that black data connection manager 222 is being used in a secure traffic state. The allocation control object allocates the second connection port to clear bypass function 230 when controller 202 determines that black data connection manager 222 is being used in a clear traffic state. The allocation control object does not allocate the second connection port to either black data function 220 or to clear bypass function 230 when controller 202 determines that black data connection manager 222 is being used in an idle state. Black data connection manager 222 also comprises an access control object for providing access control for the first connection port. In addition, black data connection manager 222 also comprises a path control object for connecting the first connection port to the second connection port when black data connection manager 222 is in an allocated state, and for disconnecting the first connection port from the second connection port when black data connection manager 222 is in an idle state.

The allocation control object in black data connection manager 222 also comprises a list which includes black data functions 220 and clear bypass functions 230 that are allowed access to the second connection port. The allocation control object also includes an authentication means for validating the identity of the functions using identification tags.

The access control object includes a linking means for connecting the first connection port to one of the black data ports. The linking means also reports the connecting status to controller 202.

The path control object in the black data connection manager further comprises a pointer transfer means for transferring a first memory location pointer between the first connection port and the second connection port when black data connection manager 222 is in an allocated state, and for not transferring the first memory location pointer when black data connection manager 222 is in an idle state.

Black crypto connection manager 226 comprises: a first connection port which is for linking to black crypto port 228, and a second connection port which is for linking to a black data function 220. Black crypto connection manager 226 also comprises an allocation control object. The allocation control object allocates the second connection port to black data function 220 when controller 202 determines that black crypto connection manager 226 is being used in a secure traffic state. The allocation control object does not allocate the second connection port to black data function 220 when controller 202 determines that black crypto connection manager 226 is being used in an idle state. Black crypto connection manager 226 also comprises an access control object for providing access control for the first connection port. In addition, black crypto connection manager 226 also comprises a path control object for connecting the first connection port to the second connection port when black crypto connection manager 226 is in an allocated state, and for disconnecting the first connection port from the second connection port when black crypto connection manager 226 is in an idle state.

The allocation control object in black crypto connection manager 226 also comprises a list which includes the black data functions that are allowed access to the second connection port. The allocation control object also includes an authentication means for validating the identity of the functions using identification tags.

The access control object includes a linking means for connecting the first connection port to one of the black crypto ports. The linking means also reports the connecting status to controller 202.

The path control object in black crypto connection manager 226 further comprises a pointer transfer means for transferring a first memory location pointer between the first connection port and the second connection port when black crypto connection manager 226 is in an allocated state, and for not transferring the first memory location pointer when black crypto connection manager 226 is in an idle state.

In a preferred embodiment of the present invention, in the fail-safe security system a unique red data function tag is used for identifying each one of the red data functions, a unique black data function tag is used for identifying each one of the black data functions, and a unique clear bypass function tag is used for identifying each one of the clear bypass functions. The tag provides the authentication means for the functions. Between any two function tags, there is a separation, and the separation in this case is a Hamming distance of two. This prevents a single bit error from causing an over-write or a write error which would cause a red data function to be switched with a black data function.

The controller monitors the operational state of the system and the current allocation of ports. The controller can be a state machine monitor object. A function can only gain access to a port through a connection manager. A function first requests access to a connection manager, and the connection manager makes the first decision with respect to the access request. The connection manager determines if the function is on the access list for that particular connection manager. If the function requesting access is on the access list, then the connection manager informs the controller of the allocation. Allocation means that a connection manager is in an allocated state. When a connection manager is in an allocated state, data can be transferred between the function and the port connected to the connection manager at a particular time. The controller is responsible for verifying that the new allocation is valid based on the current operational state of the system. If a single error is detected, controller terminates all allocations by commanding all connection managers to the idle state. When a connection manager is in an idle state, data transfer is inhibited.

Using connection managers to isolate and control the ports and using a separate controller to control the connection managers provide an important functional check and balance. The connection managers contain a list of valid functions which can access a port at any time. The connection managers are not aware of the operational state of the system. The connection manager considers any attempt to access it as valid if the function trying to access it is on the access list. A connection manager grants access to a function if the function requesting access is on the connection manager's access list and the connection manager is idle. If the requesting function is not on the access list, then the connection manager does not grant access.

Controller contains a table which identifies the allocations that are valid for a given operational state. This access validation function provides a security check and ensures proper operation of the system. The separation of these two access control features into separate functions provides the additional benefit that a failure in either function can not compromise the integrity of the security system.

As an example, assume red application 260 at red data port 214 has data which requires encryption. This sensitive data must be kept separate from other data. A red subsystem is configured to transfer this sensitive data to an encryption device. This encryption device could be part of cryptographic system 250. The red subsystem comprises a red data port, a red data connection manager, a red data function, a red crypto connection manager, and a red crypto port.

In this example, this portion of security system 200 is operating in a secure traffic state. Secure traffic state means that the red data function is processing red data. In this case, the red data function could be a red data write function which causes red data to be written to an encryption device. Secure traffic state also means that the red data connection manager is operating in an allocated state. In this example, this means that the red data connection manager transfers the red data from the red data port to the red data function. In addition, secure traffic state means that the red crypto connection manager is operating in an allocated state. In this example, this means that the red crypto connection manager transfers the red data from the red data function to the red crypto port. The red data is sensitive data and is kept isolated from other sensitive and non-sensitive data.

As a second part of this example, assume that black application 270 is present at black data port 224 and this black application needs the encrypted data. After sensitive data is encrypted by an encryption device, the sensitive data becomes non-sensitive data. In other words, red data becomes black data. A black subsystem is configured to transfer this non-sensitive data back to the black application. The black subsystem comprises a black data port, a black data connection manager, a black data function, a black crypto connection manager, and a black crypto port.

In this example, secure traffic state means that the black data function is processing black data. In this case, the black data function could be a black data read function which causes black data to be read from an encryption device. Secure traffic state also means that the black crypto connection manager is operating in an allocated state. In this example, this means that the black crypto connection manager transfers the black data from the black crypto port to the black data function. In addition, secure traffic state means that the black data connection manager is operating in an allocated state. In this example, this means that the black data connection manager transfers the black data from the black data function to the black data port. Again, this non-sensitive data is not allowed to be exchanged with or over-written by any other data.

The system design ensures that the correct red data function sends and receives the correct data from the cryptographic system. All red crypto ports have inherent security features which prevent a red crypto port from being connected to the wrong point in the cryptographic system. In addition, the system design also ensures that the correct black data function sends and receives the correct data from the cryptographic system. All black crypto ports have inherent security features which prevent a black crypto port from being connected to the wrong point in the cryptographic system. The red data function's red data is kept separate from the black data function's black data by design.

The system design ensures that the correct red data function sends and receives the correct data from the correct red applications. All red data ports have inherent security features which prevent a red data port from being connected to a wrong application. In addition, the system design also ensures that the correct black data function sends and receives the correct data from the correct black applications. All black data ports have inherent security features which prevent a black data port from being connected to the wrong application.

In a preferred embodiment of the present invention, the security system comprises multiple subsystems. A multiple subsystem security system comprises a plurality of red connection managers, a plurality of black connection managers, a plurality of red data functions, a plurality of red data ports, a plurality of red crypto ports, a plurality of black data functions, a plurality of black data ports, a plurality of black crypto ports, a plurality of clear bypass functions, and a controller. The controller is linked to the plurality of red connection managers, the plurality of black connection managers, the plurality of red data functions, the plurality of red data ports, the plurality of black data functions, and the plurality of black data ports. The red connection managers can be red data connection managers and red crypto connection managers. The black connection managers can be black data connection managers and black crypto connection managers.

Subsystems can be grouped together. The operational state of each subsystem and configuration of each subsystem is determined by the controller. Clear bypass subsystems are established when the system or a portion of the system is in a clear traffic state. Red subsystems and black subsystems are established when the system or a portion of the system is in a secure traffic state. No subsystems are established when the system is in an idle state.

Each red subsystem comprises a red data port, a red data connection manager, a red crypto port, a red crypto connection manager, and a red data function. Each red subsystem operates independently. Each black subsystem comprises a black data port, a black data connection manager, a black crypto port, a black crypto connection manager, and a black data function. Each black subsystem operates differently when the system is in either a secure traffic state, a clear traffic state, or an idle state. Each clear bypass subsystem comprises a red data port, a red data connection manager, a black data port, a black data connection manager, and a clear bypass function. Each clear bypass subsystem operates differently when the system is in either a secure traffic state, a clear traffic state, or an idle state.

In alternate embodiments, different unique levels of encryption are possible in the secure traffic state. In this case, additional different red data functions and black data functions could be used.

In a security system with multiple subsystems, each port is controlled by a unique connection manager, and each unique connection manager has a unique access list of valid functions. All valid functions are uniquely identified. Valid functions are any functions which have permission to send data to and/or receive data from a particular connection manager. Access lists are unique to the particular multiple channel security system being used. In this embodiment, the content of the access lists is determined when the system is designed. This prevents failures from occurring. Allowing access lists to dynamically change would provide an additional way to compromise the integrity of the system, and this is not desirable.

Some operating systems have security components which check access to a specific object only when the handle to it is opened and not every time the handle is used. This causes a problem because once a process successfully opens a handle, the access rights that have been granted cannot be revoked by the security system. To overcome this problem, the present invention requires a complete security check to be performed every time the handle is used.

Figure 3A:
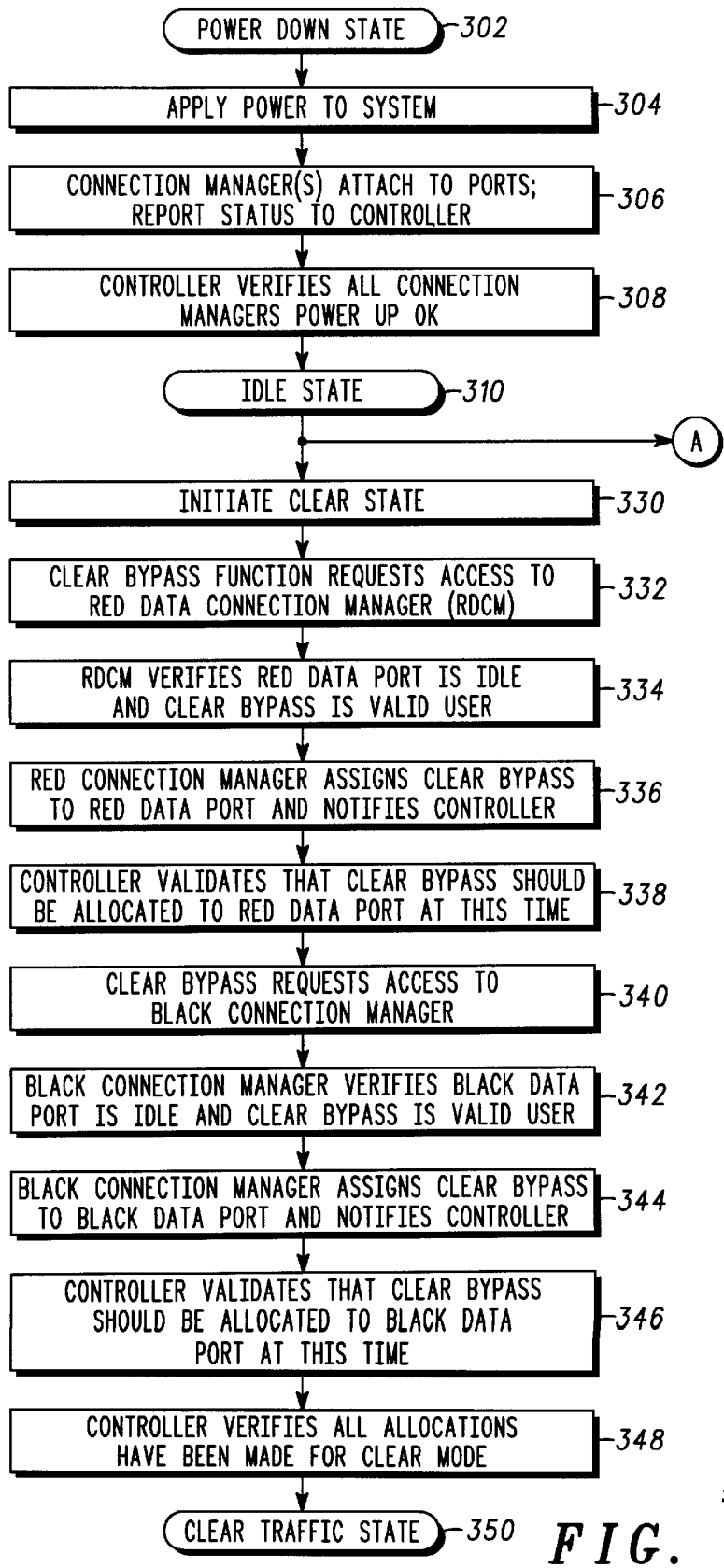
FIG. 3 shows a flow chart for a state transition procedure performed in accordance with a preferred embodiment of the present invention.
Figure 3B:
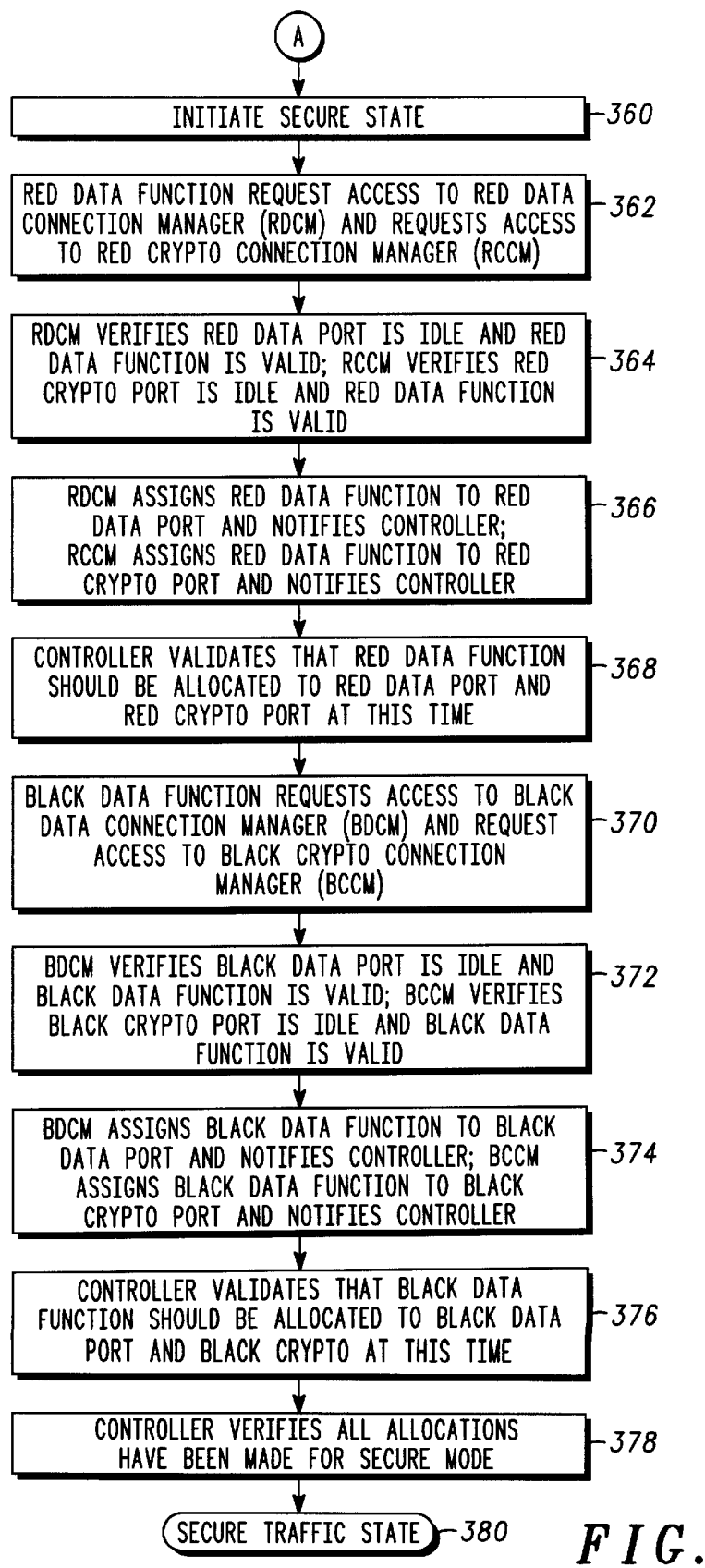

FIG. 3 shows a flow chart for a state transition procedure performed in accordance with a preferred embodiment of the present invention. Procedure 300 illustrates the steps required for the system to pass from a power down state to an idle state and from an idle state to one of two operational traffic states. The two system level operational states are a clear traffic state and a secure traffic state. Procedure 300 starts in step 302. In step 302, the system is in the power down state. In step 304, power is applied to the system. In step 306, all of the connection managers in the system attach to the ports assigned to them. The connection managers report their status to the controller. All of the connection managers must be in an idle state. This means that they are not allocated to any functions at this time. In step 308, the controller verifies that all the connection managers have powered up successfully. If the controller does not verify that all connection managers have powered up successfully, then the system proceeds into an error state and does not allow any traffic movement. When the verification is successful, the system proceeds into idle state 310.

In idle state 310, the controller waits for a state command from a system user. The system user can either issue the system an initiate clear traffic state command as shown in step 330, or an initiate secure traffic state command as shown in step 360.

Step 330 begins a series of steps which must be taken by the system to proceed into the clear traffic state. In step 332, the clear bypass function requests access to a red data connection manager. The clear bypass function is responding to an initiate clear traffic state command issued by the controller. The controller issues the command in response to a clear traffic state request from a system user.

In step 334, the red data connection manager verifies that the clear bypass function requesting access is a valid function. The red data connection manager also verifies that the red data port to which it is connected is idle. The red data connection manager verifies that it is not in an allocated state. In step 336, the red data connection manager makes an assignment of its red data port to the clear bypass function and notifies the controller.

In step 338, the controller either validates the connection request from the red data connection manager or invalidates the request. The controller has knowledge of the system state and what functions can access red data connection managers during specific states. The controller validates the assignment made by the red data connection manager. The red data connection manager proceeds into the allocated state. The red data connection manager proceeds to the idle state when the controller sends it a message invalidating the assignment.

In step 340, the clear bypass function requests access to a black data connection manager. The clear bypass function is responding to an initiate clear traffic state command issued by the controller. The controller issues the command in response to a clear traffic state request from a system user.

In step 342, the black data connection manager verifies that the clear bypass function requesting access is a valid function. The black data connection manager also verifies that the black data port to which it is connected is idle. The black data connection manager verifies that it is not in an allocated state. In step 344, the black data connection manager makes a assignment of its black data port to the clear bypass function and notifies the controller.

In step 346, the controller either validates the connection request from the black data connection manager or invalidates the request. The controller has knowledge of the system state and what functions can access black data connection managers during specific states. The controller validates the assignment made by the black data connection manager. The black data connection manager proceeds into the allocated state. The black data connection manager proceeds to the idle state when the controller sends it a message invalidating the assignment.

In step 348, the controller verifies that all allocations have been made for the clear traffic state. In a single channel system, the controller has verified that the correct red data connection manager and the correct black data connection manager have been connected to the correct clear bypass functions. In multichannel systems, the controller verifies that all of the correct red data connection managers and all of the correct black data connection managers have been connected to the correct clear bypass functions.

If a single connection is not verified, then the controller proceeds to an error state and removes all access privileges. The controller not only has validation control over all of the connection managers but also cancellation control. Cancellation control allows the controller to disable the access allocations made by the connection managers.

When all of the allocations have been verified, then procedure 300 continues to step 350. In step 350, the system is in the clear traffic state. In this state bypassed data can move between a black data port and a red data port through a clear bypass function. Bypassed data is allowed to move in either direction. Bypassed data can be red data and/or black data. In the clear traffic state and only the clear traffic state, red data is allowed to pass through a black data port.

Step 360 begins a series of steps which must be taken by the system to proceed into the secure traffic state. In step 362, a red data function requests access to a red data connection manager and a red crypto connection manager. The red data function is responding to an initiate secure traffic state command issued by the controller.

In step 364, the red data connection manager verifies that the red data function requesting access is a valid function. The red data connection manager also verifies that the red data port to which it is connected is idle. The red data connection manager verifies that it is not in an allocated state. Also, in step 364, the red crypto connection manager verifies that the red data function requesting access is a valid function. The red crypto connection manager also verifies that the red crypto port to which it is connected is idle. The red crypto connection manager verifies that it is not in an allocated state.

In step 366, the red data connection manager makes an assignment of its red data port to the red data function and notifies the controller. Also, in step 366, the red crypto connection manager makes an assignment of its red crypto port to the red data function and notifies the controller.

In step 368, the controller either validates the connection requests from the red data connection manager and the red crypto connection manager or invalidates one or more of the requests. The controller has knowledge of the system state and what functions can access red data connection managers and red crypto connection managers during specific states. The controller validates the assignment made by the red data connection manager and the red crypto connection manager. The red data connection manager and the red crypto connection manager proceed into the allocated state. The red data connection manager proceeds to the idle state when the controller sends it a message invalidating the assignment. Also, the red crypto connection manager proceeds to the idle state when the controller sends it a message invalidating the assignment.

In step 370, a black data function requests access to a black data connection manager and a black crypto connection manager. The black data function is responding to an initiate secure traffic state command issued by the controller. The controller issues the command in response to a secure traffic state request from a system user.

In step 372, the black data connection manager verifies that the black data function requesting access is a valid function. The black data connection manager also verifies that the black data port to which it is connected is idle. The black data connection manager verifies that it is not in an allocated state. Also, in step 372, the black crypto connection manager verifies that the black data function requesting access is a valid function. The black crypto connection manager also verifies that the black crypto port to which it is connected is idle. The black crypto connection manager verifies that it is not in an allocated state.

In step 374, the black data connection manager makes an assignment of its black data port to the black data function and notifies the controller. Also, in step 374, the black crypto connection manager makes an assignment of its black crypto port to the black data function and notifies the controller.

In step 376, the controller either validates the connection requests from the black data connection manager and the black crypto connection manager or invalidates one or more of the requests. The controller has knowledge of the system state and what functions can access black data connection managers and black crypto connection managers during specific states. The controller validates the assignment made by the black data connection manager and the black crypto connection manager. The black data connection manager and the black crypto connection manager proceed into the allocated state. The black data connection manager proceeds to the idle state when the controller sends it a message invalidating the assignment. Also, the black crypto connection manager proceeds to the idle state when the controller sends it a message invalidating the assignment.

In step 378, the controller verifies that all allocations have been made for the secure traffic state. In a single channel system, the controller has verified that the correct red connection managers have been connected to the correct red data function and the correct black connection managers have been connected to the correct black data function. In multi-channel systems, the controller verifies that all of the correct red connection managers are connected to the correct red data functions and all of the correct black connection managers are connected to the correct black data functions.

If a single connection is not verified, then the controller proceeds to an error state and removes all access privileges. The controller not only has validation control over all of the connection managers but also cancellation control. Cancellation control allows the controller to disable the access allocations made by the connection managers.

When all of the allocations have been verified, procedure 300 continues to step 380. In step 380, the system is in the secure traffic state. In the secure traffic state, black data traffic can only move between a black data port and black data function through a black data connection manager, and black data traffic can only move between a black crypto port and black data function through a black crypto connection manager. Also in the secure traffic state, red data traffic can only move between a red data port and red data function through a red data connection manager, and red data traffic can only move between a red crypto port and red data function through a red crypto connection manager. Data traffic is allowed in either direction.

Figure 4:
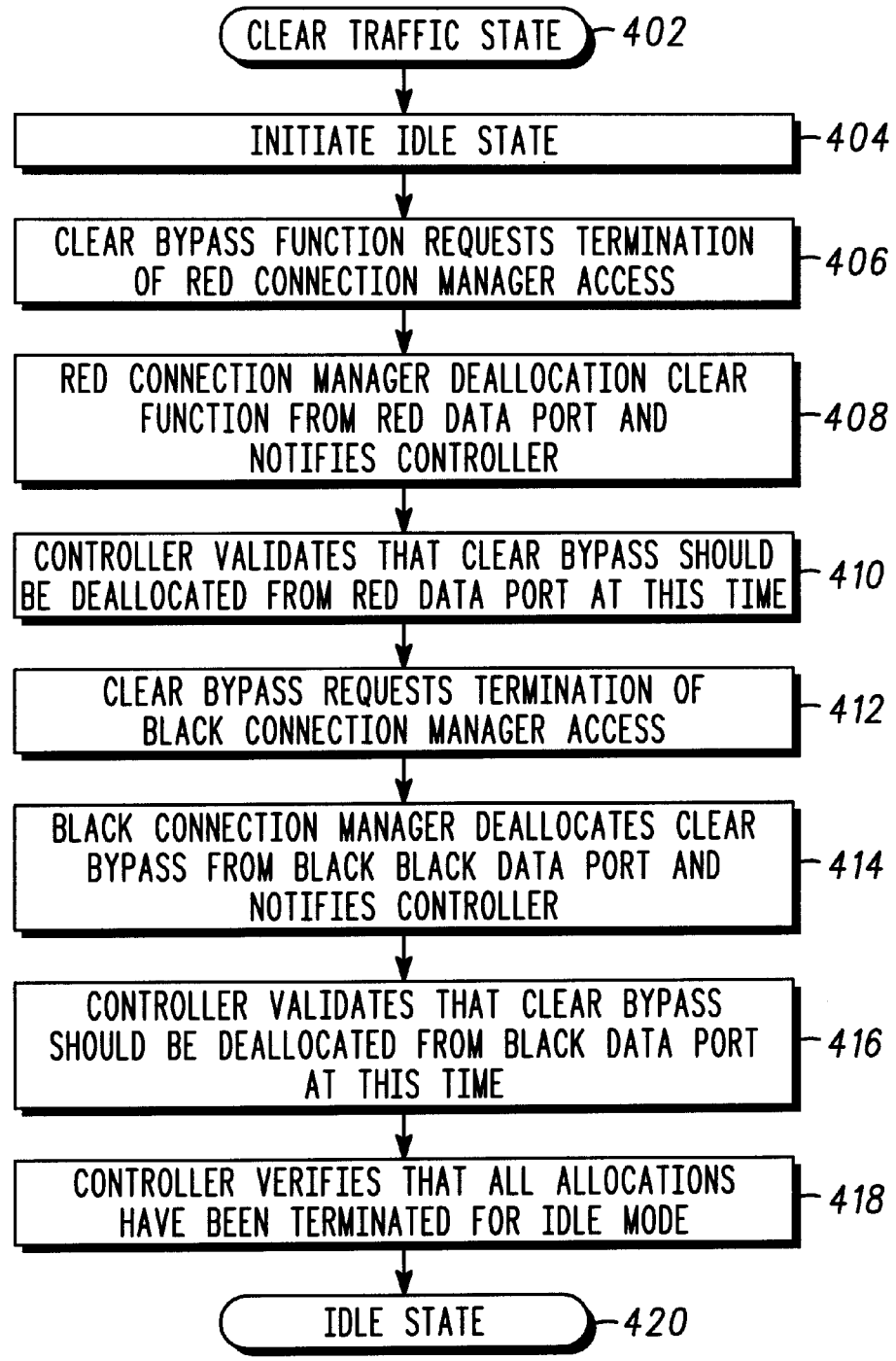
FIG. 4 shows a flow chart for a second state transition procedure performed in accordance with a preferred embodiment of the present invention.

FIG. 4 shows a flow chart for a second state transition procedure performed in accordance with a preferred embodiment of the present invention. Procedure 400 illustrates the steps required for the system to pass from a clear traffic state to an idle state. Procedure 400 starts in step 402. In step 402, the system is operating in the clear traffic state.

In the clear traffic state, the controller waits for a state command from a system user. The system user can issue the controller an initiate idle state command as shown in step 404, or an error state command can occur. In a preferred embodiment, the error state is an unrecoverable state and requires a system reset to continue. As a minimum, the error state causes all connection managers to go to the idle state and all functions to go to the idle state. In other embodiments, returning from an error state only requires acknowledgment by the user.

Step 404 begins a series of steps which must be taken by the system to proceed into the idle state. In step 406, a clear bypass function requests termination of its access to a red data connection manager. The clear bypass function is responding to an initiate idle state command issued by the controller. The controller issues the command in response to an idle state request from a system user or in response to an error.

In step 408, the red data connection manager deallocates the clear bypass function. The red data connection manager changes its state to idle and verifies that there is no active traffic through the red data port to which it is connected. The red data connection manager notifies the controller that it has deallocated the access it had with a clear bypass function.

In step 410, the controller either validates the disconnect made by the red data connection manager or invalidates the disconnect. The controller has knowledge of the system state and what functions can be connected at specific times. The red data connection manager remains in the idle state. The entire system proceeds to an idle state when the controller detects an error with the deallocation.

In step 412, a clear bypass function requests termination of its access to a black data connection manager. The clear bypass function is responding to an initiate idle state command issued by the controller. The controller issues the command in response to an idle state request from a system user or in response to an error.

In step 414, the black data connection manager deallocates the clear bypass function. The black data connection manager changes its state to idle and verifies that there is no active traffic through the black data port to which it is connected. The black data connection manager notifies the controller that it has deallocated the access it had with a clear bypass function.

In step 416, the controller either validates the disconnect made by the black data connection manager or invalidates the disconnect. The controller has knowledge of the system state and what functions can be connected at specific times. The black data connection manager remains in the idle state. The entire system proceeds to an idle state when the controller detects an error with the deallocation.

In step 418, the controller verifies that all deallocations have been made for the idle state. In a single channel system, the controller has verified that the correct red data connection manager and the correct black data connection manager are disconnected from the correct clear bypass functions. In multichannel systems, the controller verifies that all of the correct red data connection managers and all of the correct black data connection managers are disconnected from the correct clear bypass functions.

If every disconnection is not verified, then the controller proceeds to an error state and removes all access privileges. The controller not only has validation control over all of the connection managers but also cancellation control. Cancellation control allows the controller to disable the access allocations made by the connection managers.

When all of the disconnects have been verified, then procedure 400 continues to step 420. In step 420, the system is in the idle state. In this state, data traffic cannot move through any black data port or through any red data port. Also in this state, data traffic cannot move through any black crypto port or through any red crypto port. No data traffic is allowed in any direction.

Figure 5:
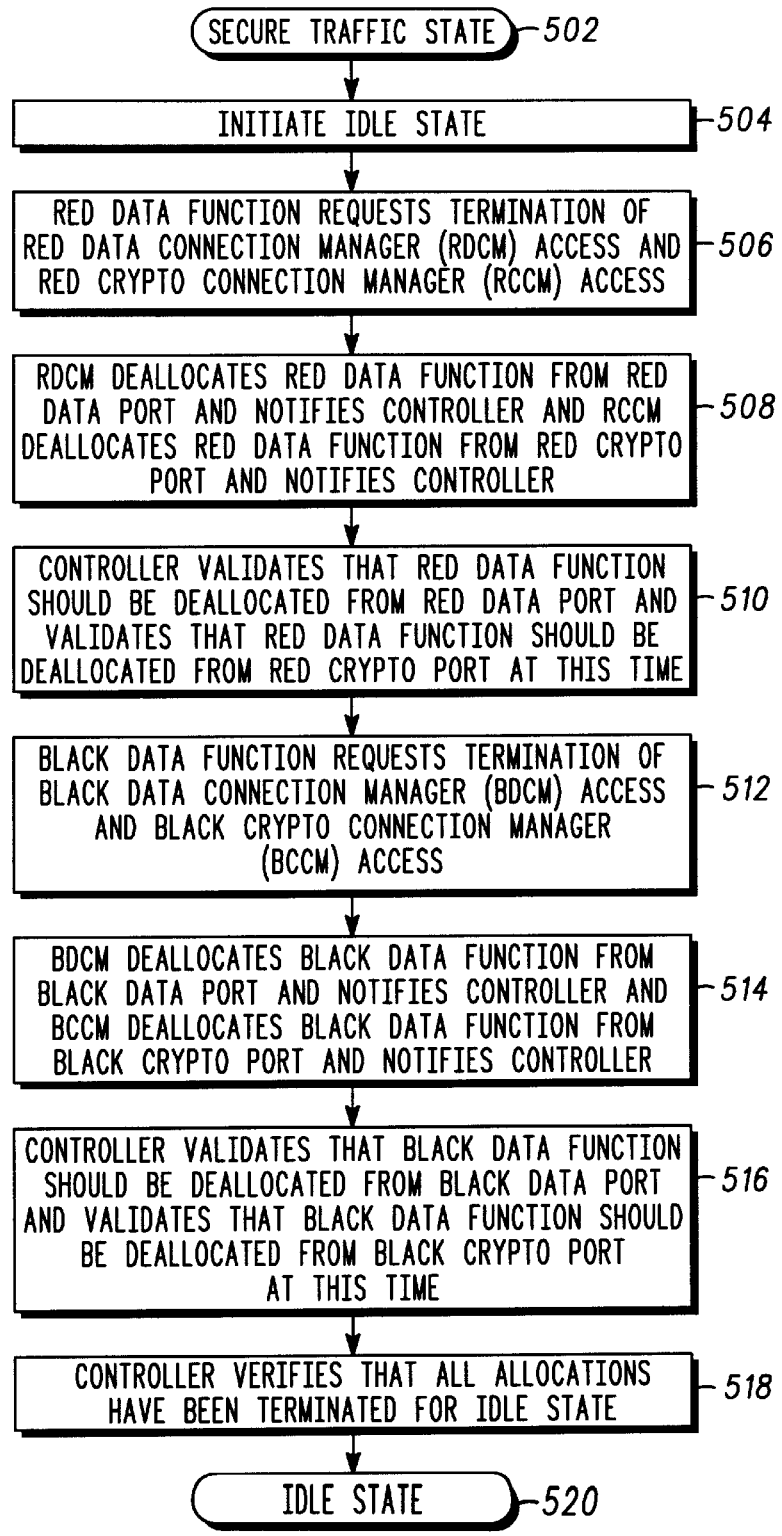
FIG. 5 shows a flow chart for a third state transition procedure performed in accordance with a preferred embodiment of the present invention.

FIG. 5 shows a flow chart for a third state transition procedure performed in accordance with a preferred embodiment of the present invention. Procedure 500 illustrates the steps required for the system to pass from a secure traffic state to an idle state. Procedure 500 starts in step 502. In step 502, the system is operating in the secure traffic state.

In the secure traffic state, the system waits for a state command from the system user. The system user can issue the controller an initiate idle state command as shown in step 504, or an error state command can occur. In a preferred embodiment, the error state is an unrecoverable state and requires a system reset to continue. As a minimum, the error state causes all connection managers to go to the idle state and all functions to go to the idle state. In other embodiments, returning from an error state only requires acknowledgment by the user.

Step 504 begins a series of steps which must be taken by the system to proceed from the secure traffic state into the idle state. In step 506, a red data function requests termination of its access to a red data connection manager and to a red crypto connection manager. The red data function is responding to an initiate idle state command issued by the controller. The controller issues the command in response to an idle state request from a system user or in response to an error.

In step 508, the red data connection manager deallocates the red data function. The red data connection manager changes its state to idle and verifies that there is no active traffic through red data port to which it is connected. The red data connection manager notifies the controller that it has deallocated the access it had with a red data function. Also, in step 508, the red crypto connection manager deallocates the red data function. The red crypto connection manager changes its state to idle and verifies that there is no active traffic through red crypto port to which it is connected. The red crypto connection manager notifies the controller that it has deallocated the access it had with a red data function.

In step 510, the controller either validates the disconnect made by the red data connection manager and the red crypto connection manager or invalidates one of more of the disconnects. The controller has knowledge of the system state and what functions can be connected at specific times. The red data connection manager remains in the idle state. Also, the red crypto connection manager remains in the idle state. The entire system proceeds to an idle state when the controller detects an error with the deallocation.

In step 512, a black data function requests termination of its access to a black data connection manager and a black crypto connection manager. The black data function is responding to an initiate idle state command issued by the controller. The controller issues the command in response to an idle state request from a system user or in response to an error.

In step 514, the black data connection manager deallocates the black data function. The black data connection manager changes its state to idle and verifies that there is no active traffic through the black data port to which it is connected. The black data connection manager notifies the controller that it has deallocated the access it had with a black data function. Also, in step 514, the black crypto connection manager deallocates the black data function. The black crypto connection manager changes its state to idle and verifies that there is no active traffic through the black crypto port to which it is connected. The black crypto connection manager notifies the controller that it has deallocated the access it had with a black data function.

In step 516, the controller either validates the disconnect made by the black data connection manager and the black crypto connection manager or invalidates one or more of the disconnects. The controller has knowledge of the system state and what functions can be connected at specific times. The black data connection manager remains in the idle state. The black crypto connection manager remains in the idle state. The entire system proceeds to an idle state when the controller detects an error with the deallocation.

In step 518, the controller verifies that all deallocations have been made for the idle state. In a single channel system, the controller has verified that the correct red connection managers are disconnected from the red data function and the correct black connection managers are disconnected from the correct black data function. In multi-channel systems, the controller verifies that all of the correct red connection managers are disconnected from the correct red data functions and that all of the correct black connection managers are disconnected from the correct black data functions.

If a single disconnection is not verified, then the controller proceeds to an error state and removes all access privileges. The controller not only has validation control over all of the connection managers but also cancellation control. Cancellation control allows the controller to disable the access allocations made by the connection managers.

When all of the disconnects have been verified, then procedure 500 continues to step 520. In step 520, the system is in the idle state. In this state, data traffic cannot move through any black data port, or through any red data port, or through any black crypto port, or through any red crypto port. No data traffic is allowed in any direction.

In a preferred embodiment of the present invention, red data functions and black data functions are process objects which contain blocks of code for performing a particular processing task. All of these objects have an object handle which is accessible to the client processes. Object handles are used to provide restricted access to the objects. A client application accesses an object by opening the handle for that object. The client application must have access rights to that object handle which define what the client application can do with the object. For example, a data write object handle could allow a client process to write data to an object.

The present invention has been described above with reference to a preferred embodiment. However, those skilled in the art will recognize that changes and modifications can be made in this embodiment without departing from the scope of the present invention. For example, while a preferred embodiment has been described in terms of a connection manager with two operational states, additional states and methods can also be employed. In addition, the present invention need not be restricted to use only in connection with a particular operating system. Those skilled in the art may easily adapt the teaching of the present invention for use with other operating systems. Accordingly, these and other changes and modifications which are obvious to those skilled in the art are intended to be included within the scope of the present invention.

What is claimed is:

1. A fail-safe security system for operation on a single processor, said fail-safe security system comprising:

at least one computer implemented red subsystem that processes red data;

at least one black subsystem that processes black data;

at least one clear bypass subsystem that processes bypassed data; and a controller linked to said at least one red subsystem, to said at least one black subsystem, and to said at least one clear bypass subsystem, said controller that inhibits processing said red data by said at least one red subsystem, that inhibits processing said black data by said at least one black subsystem, and that inhibits processing said bypassed data by said at least one clear bypass subsystem when any error is detected by said controller.

2. The fail-safe security system as claimed in claim 1, wherein said at least one red subsystem comprises:

at least one red data port for transferring some of said red data between one of said at least one red subsystem and a red application;

at least one red data function for processing said some of said red data;

at least one red data connection manager linked to said controller, wherein one of said at least one red data port is linked to one of said at least one red data connection manager and one of said at least one red data function is linked to said one of said at least one red data connection manager, said one of said at least one red data connection manager for controlling a connection between said one of said at least one red data port and said one of said at least one red data function;

at least one red crypto port for transferring said some of said red data between said one of said at least one red subsystem and a cryptographic system; and at least one red crypto connection manager linked to said controller, wherein one of said at least one red crypto port is linked to said one of said at least one red crypto connection manager and said one of said at least one red data function is linked to said one of said at least one red crypto connection manager, said one of said at least one red crypto connection manager for controlling a connection between said one of said at least one red crypto port and said one of said at least one red data function.

3. The fail-safe security system as claimed in claim 1, wherein said at least one black subsystem comprises:

at least one black data port for transferring some of said black data between one of said at least one black subsystem and a black application;

at least one black data function for processing said some of said black data;

at least one black data connection manager linked to said controller, wherein one of said at least one black data port is linked to one of said at least one black data connection manager and one of said at least one black data function is linked to said one of said at least one black data connection manager, said one of said at least one black data connection manager for controlling a connection between said one of said at least one black data port and said one of said at least one black data function;

at least one black crypto port for transferring said some of said black data between said one of said at least one black subsystem and a cryptographic system; and at least one black crypto connection manager linked to said controller, wherein one of said at least one black crypto port is linked to said one of said at least one black crypto connection manager and said one of said at least one black data function is linked to said one of said at least one black crypto connection manager, said one of said at least one black crypto connection manager for controlling a connection between said one of said at least one black crypto port and said one of said at least one black data function.

4. The fail-safe security system as claimed in claim 1, wherein said at least one clear bypass subsystem comprises:
   at least one black data port for transferring some of said bypassed data into and out of one of said at least one clear bypass subsystem;
   at least one red data port for transferring said some of said bypassed data into and out of said one of said at least one clear bypass subsystem;
   at least one clear bypass function for processing said some of said bypassed data;
   at least one black data connection manager linked to one of said at least one black data port and to said controller and to one of said at least one clear bypass function, one of said at least one black data connection manager for controlling a connection between said one of said at least one black data port and said one of said at least one clear bypass function; and
   at least one red data connection manager linked to one of said at least one red data port and to said controller and to one of said at least one clear bypass function, one of said at least one red data connection manager for controlling a connection between said one of said at least one red data port and said one of said at least one clear bypass function.

5. The fail-safe security system as claimed in claim 1, wherein:
   said at least one red subsystem comprises:
      a red data port linked to said controller, said red data port for transferring some of said red data between one of said at least one red subsystem and a red application;
      a red data function linked to said controller, said red data function for processing said some of said red data;
      a red data connection manager linked to said red data port, to said red data function, and to said controller, said red data connection manager for controlling a connection between said red data port and said red data function;
      a red crypto port linked to said controller, said red crypto port for transferring said some of said red data between said one of said at least one red subsystem and a cryptographic system;
      a red crypto connection manager linked to said red crypto port, to said red data function, and to said controller, said red crypto connection manager for controlling a connection between said red crypto port and said red data function;
   said at least one black subsystem comprises:
      a black data port linked to said controller, said black data port for transferring some of said black data between one of said at least one black subsystem and a black application;
      a black data function linked to said controller, said some of said black data function for processing said black data;
      a black data connection manager linked to said black data port, to said black data function, and to said controller, said black data connection manager for controlling a connection between said black data port and said black data function;
      a black crypto port linked to said controller, said black crypto port for transferring said some of said black data between said one of said at least one black subsystem and said cryptographic system;
      a black crypto connection manager linked to said black crypto port, to said black data function, and to said controller, said black crypto connection manager for controlling a connection between said black crypto port and said black data function;
   said at least one clear bypass subsystem comprises:
      said black data port for transferring some of said bypassed data into and out of said at least one clear bypass subsystem;
      said red data port for transferring said some of said bypassed data into and out of said at least one clear bypass subsystem;
      a clear bypass function for processing said some of said bypassed data;
      said black data connection manager linked to said black data port and linked to said clear bypass function, said black data connection manager for controlling a connection between said black data port and said clear bypass function; and
      said red data connection manager linked to said red data port and linked to said clear bypass function, said red data connection manager for controlling a connection between said red data port and said clear bypass function.

6. The fail-safe security system as claimed in claim 5, wherein said red data connection manager comprises:
   a first connection port for linking to said red data port;
   a second connection port for linking to said red data function and for linking to a clear bypass function;
   an allocation control object linked to said controller and to said second connection port, said allocation control object for allocating said second connection port to said red data function when said controller determines said red data connection manager is being used in a first allocated state, for allocating said second connection port to said clear bypass function when said controller determines said red data connection manager is being used in a second allocated state, and for not allocating said second connection port to said red data function and to said clear bypass function when said controller determines said red data connection manager is being used in an idle state;
   an access control object linked to said controller and to said first connection port, said access control object for providing access control for said first connection port; and
   a path control object linked to said controller, to said first connection port and to said second connection port, said path control object for connecting said first connection port to said second connection port when said red data connection manager is in said first allocated state, for connecting said first connection port to said second connection port when said red data connection manager is in said second allocated state, and for disconnecting said first connection port from said second connection port when said red data connection manager is in said idle state.

7. The red data connection manager as claimed in claim 6, wherein said allocation control object further comprises:

a list comprising identification tags, said identification tags for identifying red data functions and clear bypass functions that are allowed access to said second connection port; and an authentication means for validating said red data functions and said clear bypass functions using said identification tags.

8. The red data connection manager as claimed in claim 6, wherein said path control object further comprises:

pointer transfer means for transferring a first memory location pointer between said first connection port and said second connection port when said red data connection manager is in said first allocated state, for transferring said first memory location pointer between said first connection port and said second connection port when said red data connection manager is in said second allocated state, and for not transferring said first memory location pointer when said red data connection manager is in said idle state.

9. The fail-safe security system as claimed in claim 5, wherein said red crypto connection manager comprises:

a first connection port for linking to said red crypto port;

a second connection port for linking to said red data function;

an allocation control object linked to said second connection port, said allocation control object for allocating said second connection port to said red data function when said controller determines said red crypto connection manager is being used in an allocated state and for not allocating said second connection port to said red data function when said controller determines said red crypto connection manager is being used in an idle state, wherein said allocation control object uses a list comprising identification tags, said identification tags for identifying red data functions that are allowed access to said second connection port and an authentication means, said authentication means for validating said red data functions using said identification tags an access control object linked to said first connection port, said access control object for providing access control for said first connection port; and a path control object linked to said first connection port and said second connection port, said path control object for connecting said first connection port to said second connection port when said red crypto connection manager is in said allocated state, and for disconnecting said first connection port from said second connection port when said red crypto connection manager is in said idle state, wherein said path control object uses a pointer transfer means for transferring a first memory location pointer between said first connection port and said second connection port when said red crypto connection manager is in said allocated state and for not transferring said first memory location pointer when said red crypto connection manager is in an idle state.

10. The fail-safe security system as claimed in claim 5, wherein said black data connection manager comprises:

a first connection port for linking to said black data port;

a second connection port for linking to said black data function and for linking to a clear bypass function;

an allocation control object linked to said controller and to said second connection port, said allocation control object for allocating said second connection port to said black data function when said controller determines said black data connection manager is being used in a first allocated state, for allocating said second connection port to said clear bypass function when said controller determines said black data connection manager is being used in a second allocated state, and for not allocating said second connection port to said black data function and to said clear bypass function when said controller determines said black data connection manager is being used in an idle state;

an access control object linked to said controller and to said first connection port, said access control object for providing access control for said first connection port; and a path control object linked to said controller, to said first connection port and to said second connection port, said path control object for connecting said first connection port to said second connection port when said black data connection manager is in said first allocated state, for connecting said first connection port to said second connection port when said black data connection manager is in said second allocated state, and for disconnecting said first connection port from said second connection port when said black data connection manager is in said idle state.

11. The black data connection manager as claimed in claim 10, wherein said allocation control object further comprises:

a list comprising identification tags, said identification tags for identifying black data functions and clear bypass functions that are allowed access to said second connection port; and an authentication means for validating said black data functions and said clear bypass functions using said identification tags.

12. The black data connection manager as claimed in claim 10, wherein said path control object further comprises:

pointer transfer means for transferring a first memory location pointer between said first connection port and said second connection port when said black data connection manager is in said first allocated state, for transferring said first memory location pointer between said first connection port and said second connection port when said black data connection manager is in said second allocated state, and for not transferring said first memory location pointer when said black data connection manager is in said idle state.

13. The fail-safe security system as claimed in claim 5, wherein said black crypto connection manager comprises:

a first connection port for linking to said black crypto port;

a second connection port for linking to said black data function;

an allocation control object linked to said second connection port, said allocation control object for allocating said second connection port to said black data function when said controller determines said black crypto connection manager is being used in an allocated state and for not allocating said second connection port to said black data function when said controller determines said black crypto connection manager is being used in an idle state, wherein said allocation control object uses a list comprising identification tags, said identification tags for identifying black data functions that are allowed access to said second connection port and an authentication means, said authentication means for validating said black data functions using said identification tags;

an access control object linked to said first connection port, said access control object for providing access control for said first connection port; and a path control object linked to said first connection port and said second connection port, said path control object for connecting said first connection port to said second connection port when said black crypto connection manager is in said allocated state, and for disconnecting said first connection port from said second connection port when said black crypto connection manager is in said idle state, wherein said path control object uses a pointer transfer means for transferring a first memory location pointer between said first connection port and said second connection port when said black crypto connection manager is in said allocated state and for not transferring said first memory location pointer when said black crypto connection manager is in an idle state.

14. The fail-safe security system as claimed in claim 1, wherein said failsafe security system further comprises:

a plurality of red data function tags, each red data function tag for identifying by said controller each one of a plurality of red data functions;

a plurality of black data function tags, each black data function tag for identifying by said controller each one of a plurality of black data functions; and a plurality of clear bypass function tags, each clear bypass function tag for identifying by said controller each one of a plurality of clear bypass functions.

15. A computer implemented method of operating a fail-safe security system for processing black data and red data on a single processor, said method comprising the steps of:

processing red data by a red subsystem of said fail-safe security system, said red subsystem controlled by a controller;

processing black data by a black subsystem of said fail-safe security system, said black subsystem controlled by said controller;

processing bypassed data by a clear bypass subsystem of said fail-safe security system, said clear bypass subsystem controlled by said controller; and inhibiting said processing red data, said processing black data and said processing bypassed data when said fail-safe security system detects any error.

16. The method as claimed in claim 15, wherein said method further comprises the steps of:

responding to a secure traffic state request by performing said processing red data step, said processing black data step, and inhibiting said processing bypassed data step;

responding to a clear traffic state request by inhibiting said processing red data step, said processing black data step and performing said processing bypassed data step; and responding to an idle state request by inhibiting said processing red data step, said processing black data step and said processing bypassed data step.

17. The method as claimed in claim 16, wherein said step of responding to a secure traffic state request comprises the steps of:

configuring said red subsystem as a red data port, a red data connection manager, a red data function, a red crypto connection manager, and a red crypto port;

linking said red data port to said red data connection manager;

allocating said red data function to said red data connection manager;

connecting said red data function to said red data port by said red data connection manager;

linking said red crypto port to said red crypto connection manager;

allocating said red data function to said red crypto connection manager;

connecting said red data function to said red crypto port by said red data connection manager;

processing some of said red data between said red data port and said red crypto port;

configuring said black subsystem as a black data port, a black data connection manager, a black data function, a black crypto connection manager, and a black crypto port;

linking said black data port to said black data connection manager;

allocating said black data function to said black data connection manager;

connecting said black data function to said black data port by said black data connection manager;

linking said black crypto port to said black crypto connection manager;

allocating said black data function to said black crypto connection manager;

connecting said black data function to said black crypto port by said black data connection manager; and processing some of said black data between said black data port and said black crypto port.

18. The method as claimed in claim 16, wherein said step of responding to a clear traffic state request comprises the steps of:

configuring said clear bypass subsystem as a black data port, a black data connection manager, a red data port, a red data connection manager and a clear bypass function;

linking said black data port to said black data connection manager;

allocating said clear bypass function to said black data connection manager;

linking said red data port to said red data connection manager;

allocating said clear bypass function to said red data connection manager;

connecting said clear bypass function to said black data port by said black data connection manager;

connecting said clear bypass function to said red data port by said red data connection manager; and processing some of said bypassed data between said black data port and said red data port.

19. The method as claimed in claim 16, wherein said step of responding to an idle state request comprises the steps of:

deallocating a red data connection manager;

deallocating a black data connection manager;

deallocating a red crypto connection manager; and deallocating a black crypto connection manager.

20. The method as claimed in claim 15, wherein said method further comprises the steps of:

establishing a plurality of red subsystems;

establishing a black subsystem for each one of said plurality of red subsystems; and establishing a plurality of clear bypass subsystems.

21. The method as claimed in claim 15, wherein said processing red data step comprises the steps of:

configuring said red subsystem as a red data port, a red data connection manager, a red data function, a red crypto connection manager, and a red crypto port;

linking said red data port to said red data connection manager;

allocating said red data function to said red data connection manager;

connecting said red data function to said red data port by said red data connection manager;

linking said red crypto port to said red crypto connection manager;

allocating said red data function to said red crypto connection manager;

connecting said red data function to said red crypto port by said red data connection manager; and transferring said red data between said red data port and said red crypto port.

22. The method as claimed in claim 15, wherein said processing black data step comprises the steps of:

configuring said black subsystem as a black data port, a black data connection manager, a black data function, a black crypto connection manager, and a black crypto port;

linking said black data port to said black data connection manager;

allocating said black data function to said black data connection manager;

connecting said black data function to said black data port by said black data connection manager;

linking said black crypto port to said black crypto connection manager;

allocating said black data function to said black crypto connection manager;

connecting said black data function to said black crypto port by said black data connection manager; and transferring said black data between said black data port and said black crypto port.

23. The method as claimed in claim 15, wherein said processing bypassed data step comprises the steps of:

configuring said clear bypass subsystem as a black data port, a black data connection manager, a red data port, a red data connection manager, and a clear bypass function;

linking said black data port to said black data connection manager;

allocating said clear bypass function to said black data connection manager;

linking said red data port to said red data connection manager;

allocating said clear bypass function to said red data connection manager;

connecting said clear bypass function to said black data port by said black data connection manager when said processing black data step is not inhibited;

connecting said clear bypass function to said red data port by said red data connection manager when said processing black data step is not inhibited; and transferring bypassed data between said black data port and said red data port.

24. The method as claimed in claim 15, wherein said inhibiting step comprises the steps of:

operating said red subsystem in an idle state wherein said processing red data step is inhibited;

operating said black subsystem in an idle state wherein said processing black data step is inhibited; and operating said clear bypass subsystem in an idle state wherein said processing bypassed data step is inhibited.

* * * * *